(12) United States Patent
Song

(10) Patent No.: US 9,461,297 B2
(45) Date of Patent: Oct. 4, 2016

(54) BATTERY UNIT AND BATTERY MODULE USING THE SAME

(71) Applicant: SAMSUNG SDI CO., LTD., Yongin-si, Gyeonggi-do (KR)

(72) Inventor: Jang-Hyun Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 405 days.

(21) Appl. No.: 14/049,084

(22) Filed: Oct. 8, 2013

(65) Prior Publication Data

US 2014/0302380 A1 Oct. 9, 2014

(30) Foreign Application Priority Data

Apr. 8, 2013 (KR) .................. 10-2013-0038284

(51) Int. Cl.
| | |
|---|---|
| *H01M 2/22* | (2006.01) |
| *H01M 2/30* | (2006.01) |
| *H01M 2/04* | (2006.01) |
| *H01M 10/04* | (2006.01) |
| *H01M 2/08* | (2006.01) |

(52) U.S. Cl.
CPC ............. *H01M 2/30* (2013.01); *H01M 2/0473* (2013.01); *H01M 2/22* (2013.01); *H01M 10/0431* (2013.01); *H01M 2/08* (2013.01)

(58) Field of Classification Search
None
See application file for complete search history.

(56) References Cited

U.S. PATENT DOCUMENTS

| | | | |
|---|---|---|---|
| 9,136,523 B2* | 9/2015 | Song .................... | H01M 2/305 |
| 2010/0081048 A1 | 4/2010 | Nansaka et al. | |
| 2010/0173190 A1 | 7/2010 | Tsuchiya | |
| 2011/0045345 A1 | 2/2011 | Tsuchiya et al. | |
| 2011/0070466 A1 | 3/2011 | Park et al. | |
| 2011/0159353 A1* | 6/2011 | Byun .................... | H01M 2/206 |
| | | | 429/160 |
| 2011/0244309 A1 | 10/2011 | Byun et al. | |
| 2011/0300414 A1 | 12/2011 | Baek | |
| 2012/0156536 A1* | 6/2012 | Yamazaki ............... | H01M 2/06 |
| | | | 429/96 |

(Continued)

FOREIGN PATENT DOCUMENTS

| | | |
|---|---|---|
| DE | 10 2010 062 183 A1 | 5/2012 |
| EP | 2 357 686 A1 | 8/2011 |

(Continued)

OTHER PUBLICATIONS

EPO Office action dated Aug. 26, 2015, corresponding to European Patent application 13195590.8, (11 pages).

(Continued)

*Primary Examiner* — Alix Eggerding
(74) *Attorney, Agent, or Firm* — Lewis Roca Rothgerber Christie LLP

(57) ABSTRACT

A battery unit and a battery module including a plurality of battery units. A battery unit includes: a case accommodating an electrode assembly and having an opening; a cap plate covering the opening and having a terminal insertion portion penetrating the cap plate; a terminal member extending into the case through the terminal insertion portion to electrically expose the electrode assembly outside of the case; and a fixing member in the terminal insertion portion and fixing the terminal member to the cap plate, the fixing member being formed by an insert injection molding method in which a plastic resin is injected in the terminal insertion portion in a state in which the terminal member is inserted in the terminal insertion portion, the fixing member including a recessed portion that is recessed from an upper surface of the fixing member.

19 Claims, 14 Drawing Sheets

(56) References Cited

U.S. PATENT DOCUMENTS

| | | |
|---|---|---|
| 2012/0328932 A1 | 12/2012 | Guen et al. |
| 2013/0078506 A1 | 3/2013 | Guen |
| 2013/0323591 A1 | 12/2013 | Woehrle et al. |
| 2014/0212739 A1 | 7/2014 | Harada et al. |

FOREIGN PATENT DOCUMENTS

| | | |
|---|---|---|
| EP | 2 429 011 A1 | 3/2012 |
| EP | 2 495 784 A2 | 9/2012 |
| JP | 2005-339990 A | 12/2005 |
| JP | 2006-216411 | 8/2006 |
| JP | 2006-236790 A | 9/2006 |
| JP | 2008-311014 A | 12/2008 |
| JP | 2009-283256 A | 12/2009 |
| JP | 2010-80355 A | 4/2010 |
| JP | 2010-272324 | 12/2010 |
| JP | 2010-282847 A | 12/2010 |
| JP | 2011-23142 | 2/2011 |
| WO | WO2012/169055 A1 | 12/2012 |
| WO | WO 2013/002049 A1 | 1/2013 |

OTHER PUBLICATIONS

U.S. Notice of Allowance dated Aug. 28, 2015, for cross reference U.S. Appl. No. 14/049,160, (8 pages).
U.S. Notice of Allowance dated Sep. 10, 2015, for cross reference U.S. Appl. No. 14/048,943, (8 pages).
EPO Search Report dated Dec. 11, 2014, corresponding to European Patent application 13195590.8, (14 pages).
Patent Abstracts of Japan, and English machine translation of Japanese Publication 2006-216411 dated Aug. 17, 2006, listed above, (14 pages).
U.S. Office action dated Jan. 15, 2015, for cross reference U.S. Appl. No. 14/048,943, (14 pages).
U.S. Office action dated Jan. 15, 2015, for cross reference U.S. Appl. No. 14/049,160, (18 pages).
EPO Search Report dated Jul. 2, 2014, for European Patent application 13195587.4, (7 pages).
Patent Abstracts of Japan, and English machine translation of Japanese Publication 2010-272324 dated Dec. 2, 2010, listed above, (15 pages).
EPO Search Report dated Aug. 6, 2014, for corresponding European Patent application 13195605.4, (6 pages).
EPO Search Report dated Aug. 21, 2014, for European Patent application 13195590.8, (8 pages).
Patent Abstracts of Japan, and English machine translation of Japanese Publication 2011-23142 dated Feb. 3, 2011, listed above, (31 pages).
U.S. Office action dated May 7, 2015, for cross reference U.S. Appl. No. 14/049,160, (12 pages).
U.S. Office action dated May 20, 2015, for cross references U.S. Appl. No. 14/048,943, (10 pages).
English Machine Translation of Japanese Patent Publication No. 2005-339990 A, dated Dec. 8, 2005, 40 pages.
English Machine Translation of Japanese Patent Publication No. 2006-236790 A, dated Sep. 7, 2006, 36 pages.
English Machine Translation of Japanese Patent Publication No. 2010-282847 A, dated Dec. 16, 2010, 59 pages.
EPO Search Report dated Nov. 3, 2014, corresponding to European Patent application 13195587.4, (12 pages).
EPO Office action dated Jul. 14, 2016 for corresponding European Patent application 13195605.4 (7 pages).

\* cited by examiner

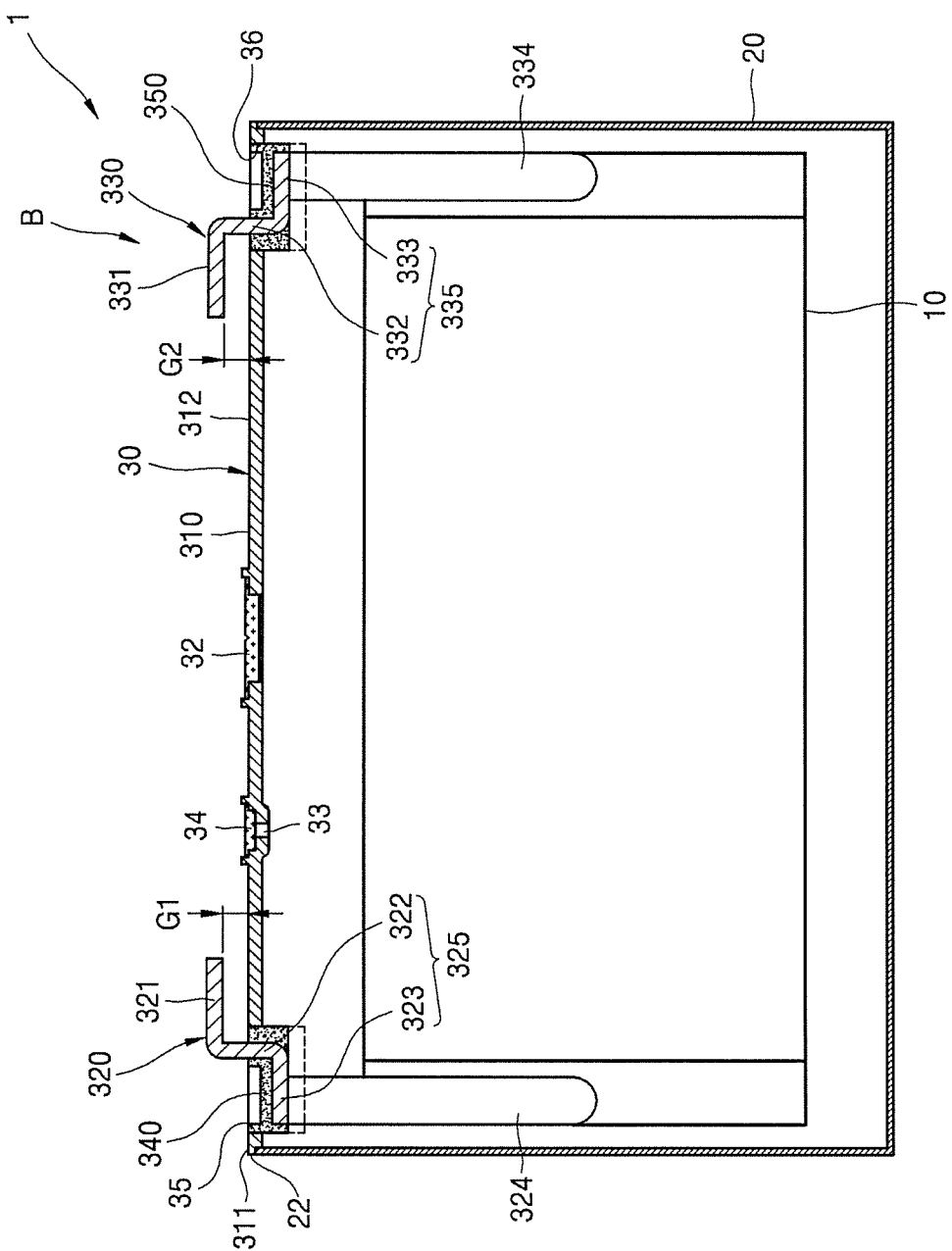

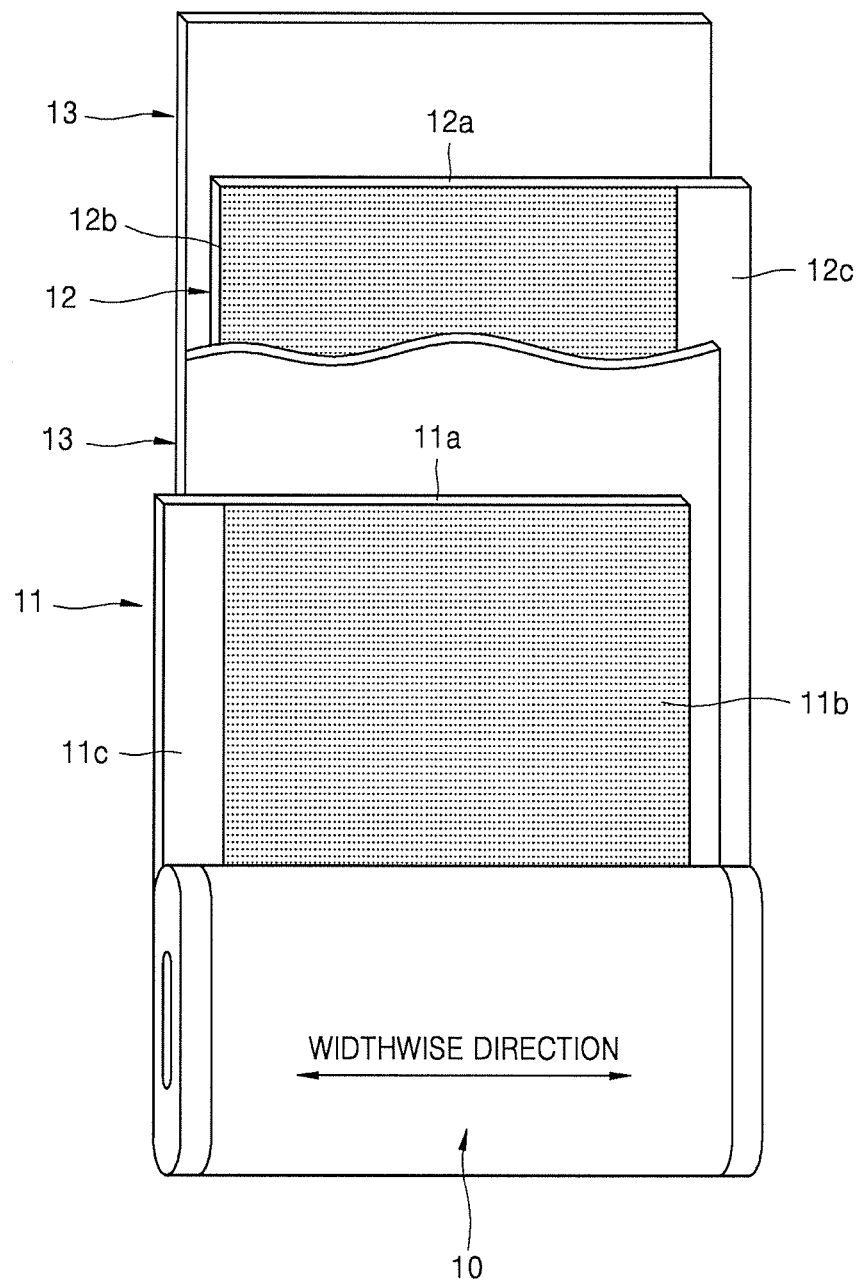

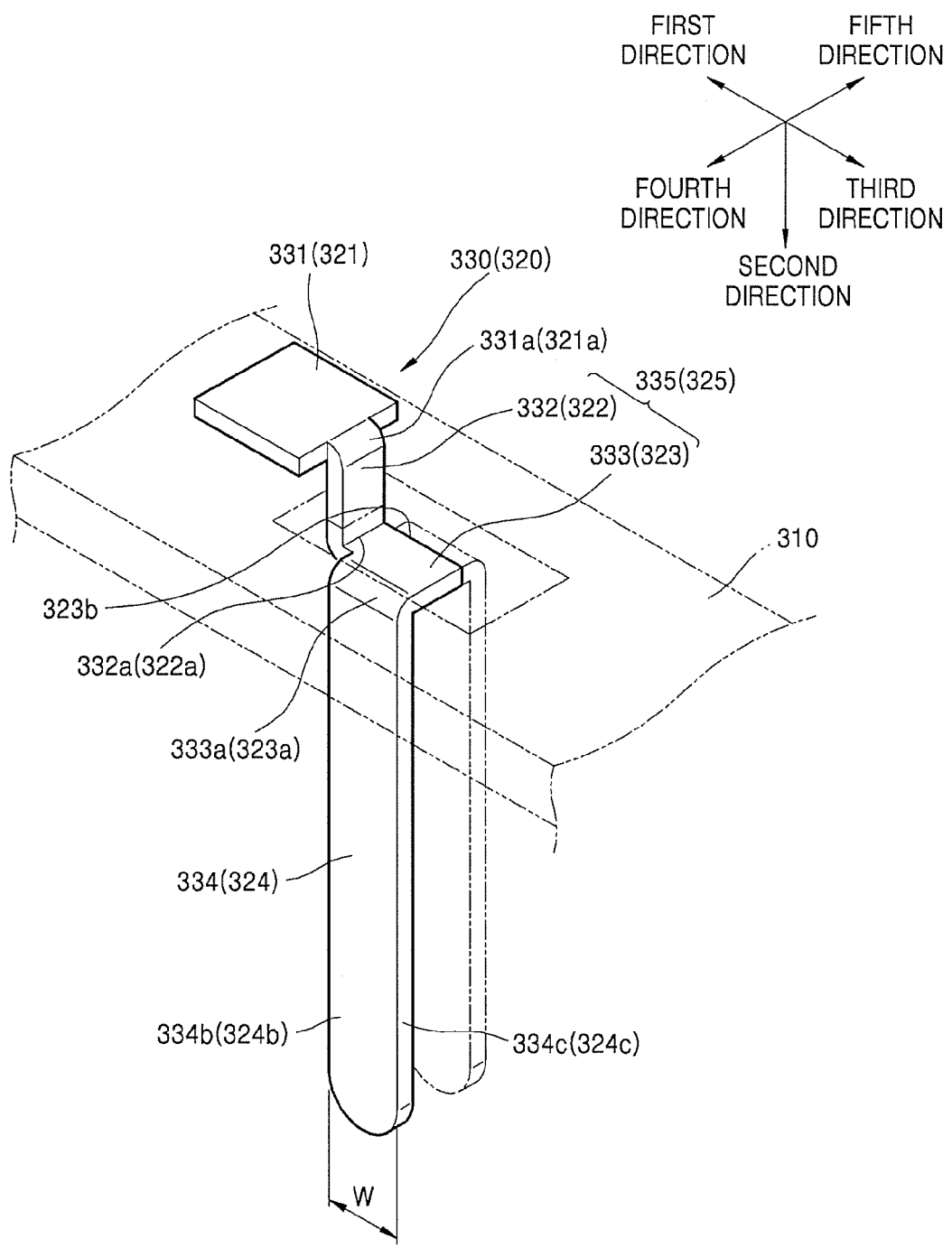

BATTERY UNIT AND BATTERY MODULE USING THE SAME

CROSS-REFERENCE TO RELATED APPLICATIONS

This application claims priority to and the benefit of Korean Patent Application No. 10-2013-0038284, filed on Apr. 8, 2013 in the Korean Intellectual Property Office, the entire content of which is incorporated herein by reference. In addition, the present application incorporates herein by reference the entire contents of U.S. Pat. No. 9,240,581, issued Jan. 19, 2016, and U.S. Pat. No. 9,231,240, issued Jan. 5, 2016.

BACKGROUND

1. Field

Aspects of embodiments of the present invention relate to a battery unit and a battery module including a plurality of battery units connected with each other.

2. Description of the Related Art

In general, secondary batteries are chargeable and dischargeable, unlike primary batteries that are not chargeable. Secondary batteries may be used as energy sources for mobile devices, electric vehicles, hybrid cars, electric bicycles, uninterruptable power supplies, etc. Also, a secondary battery may be used in the form of a single battery or a battery module in which a plurality of batteries are electrically connected into a single unit by using a bus bar, such as according to a type of external device that adopts the secondary battery.

A compact mobile device, such as a mobile phone, with the output and capacity of a single battery may operate for a predetermined time. However, when a long operation or a high power operation is needed, as in electric vehicles or hybrid cars, a battery module is used due to an output and capacity problem of a single battery. The battery module may increase an output voltage or an output current according to the number of included batteries. The battery module may obtain a desired output voltage or output current by connecting a plurality of batteries serially or in parallel.

SUMMARY

According to aspects of embodiments of the present invention, a battery unit has an improved assembly of an electrode terminal, which may reduce manufacturing costs, and a battery module includes a plurality of the battery units.

Additional aspects will be set forth in part in the description which follows and, in part, will be apparent from the description, or may be learned by practice of the presented embodiments.

According to one or more embodiments of the present invention, a battery unit includes: a case accommodating an electrode assembly and having an opening; a cap plate covering the opening and having a terminal insertion portion penetrating the cap plate; a terminal member extending into the case through the terminal insertion portion to electrically expose the electrode assembly outside of the case; and a fixing member in the terminal insertion portion and fixing the terminal member to the cap plate, the fixing member being formed by an insert injection molding method in which a plastic resin is injected in the terminal insertion portion in a state in which the terminal member is inserted in the terminal insertion portion, the fixing member including a recessed portion that is recessed from an upper surface of the fixing member.

The fixing member may include a lower wall and a side wall extending upward from the lower wall and coupled to an edge of the terminal insertion portion.

The side wall may extend upward above an upper surface of the cap plate.

The fixing member may further include an extended portion extending outward from the side wall over an edge of the terminal insertion portion and supported on an upper surface of the cap plate.

The terminal member may include a current collector portion electrically connected to the electrode assembly, a terminal portion exposed outside of the cap plate, and a connection portion connecting the current collector portion and the terminal portion.

The terminal portion may be spaced apart from an upper surface of the cap plate.

The terminal portion may extend in a direction along a major side of the cap plate, the connection portion may include a first bending portion extending downward from the terminal portion and a second bending portion extending in the major side direction from the first bending portion, and the current collector portion may extend downward from an edge of the second bending portion in a direction along a minor side of the cap plate.

The second bending portion may be partially buried in the fixing member.

The second bending portion may be entirely buried in the fixing member.

The fixing member may include a first fixing portion filling the terminal insertion portion and including the recessed portion, and a second fixing portion filling a gap between the terminal portion and the upper surface of the cap plate.

The terminal member may include a positive terminal member and a negative terminal member, and the positive terminal member and the negative terminal member may include dissimilar metals.

The positive terminal member may include aluminum (Al), and the negative terminal member may include copper (Cu).

The terminal member may further include a welding layer on an upper surface of one of the positive terminal member or the negative terminal member and including a same metal as that of the other one of the positive terminal member or the negative terminal member.

According to one or more embodiments of the present invention, a battery module includes a plurality of the battery units described above, and a bus bar connecting terminal portions of the terminal members of neighboring battery units of the plurality of battery units.

The fixing member may include the lower wall and a side wall extending upward from the lower wall and coupled to an edge of the terminal insertion portion.

The side wall may extend upward above an upper surface of the cap plate.

The fixing member may further include an extended portion extending outward from the side wall over an edge of the terminal insertion portion and supported on an upper surface of the cap plate.

The terminal member may include a current collector portion electrically connected to the electrode assembly, a terminal portion exposed outside of the cap plate, and a connection portion connecting the current collector portion and the terminal portion.

The terminal portion may be spaced apart from an upper surface of the cap plate and extend in a direction along a major side of the cap plate, the connection portion may include a first bending portion extending downward from the terminal portion and a second bending portion extending in the major side direction from the first bending portion, and the current collector portion may extend downward from an edge of the second bending portion in a direction along a minor side of the cap plate.

At least a part of the second bending portion may be buried in the fixing member.

The bus bar may be welded to the terminal portions.

The terminal members may include a positive terminal member and a negative terminal member, and the positive terminal member and the negative terminal member may include dissimilar metals.

The bus bar may include a similar metal to at least one of the positive terminal member or the negative terminal member.

The terminal member may further include a welding layer on an upper surface of one of the positive terminal member or the negative terminal member and including a same metal as that of the bus bar, the upper surface including a metal different from that of the bus bar.

The positive terminal member may include aluminum (Al), the negative terminal member include copper (Cu), the bus bar may include Al, and the welding layer may include Al and be on an upper surface of a terminal portion of the negative terminal member.

BRIEF DESCRIPTION OF THE DRAWINGS

The above and other features and aspects of the present invention will become more apparent by describing in further detail some exemplary embodiments thereof with reference to the attached drawings in which:

FIG. 2 is a cross-sectional view of the battery unit of FIG. 1, taken along the line II-II';

FIG. 3 is a perspective view illustrating an example of an electrode assembly;

FIG. 4 is a perspective view illustrating a terminal member according to an embodiment of the present invention;

DETAILED DESCRIPTION

Figure 1:
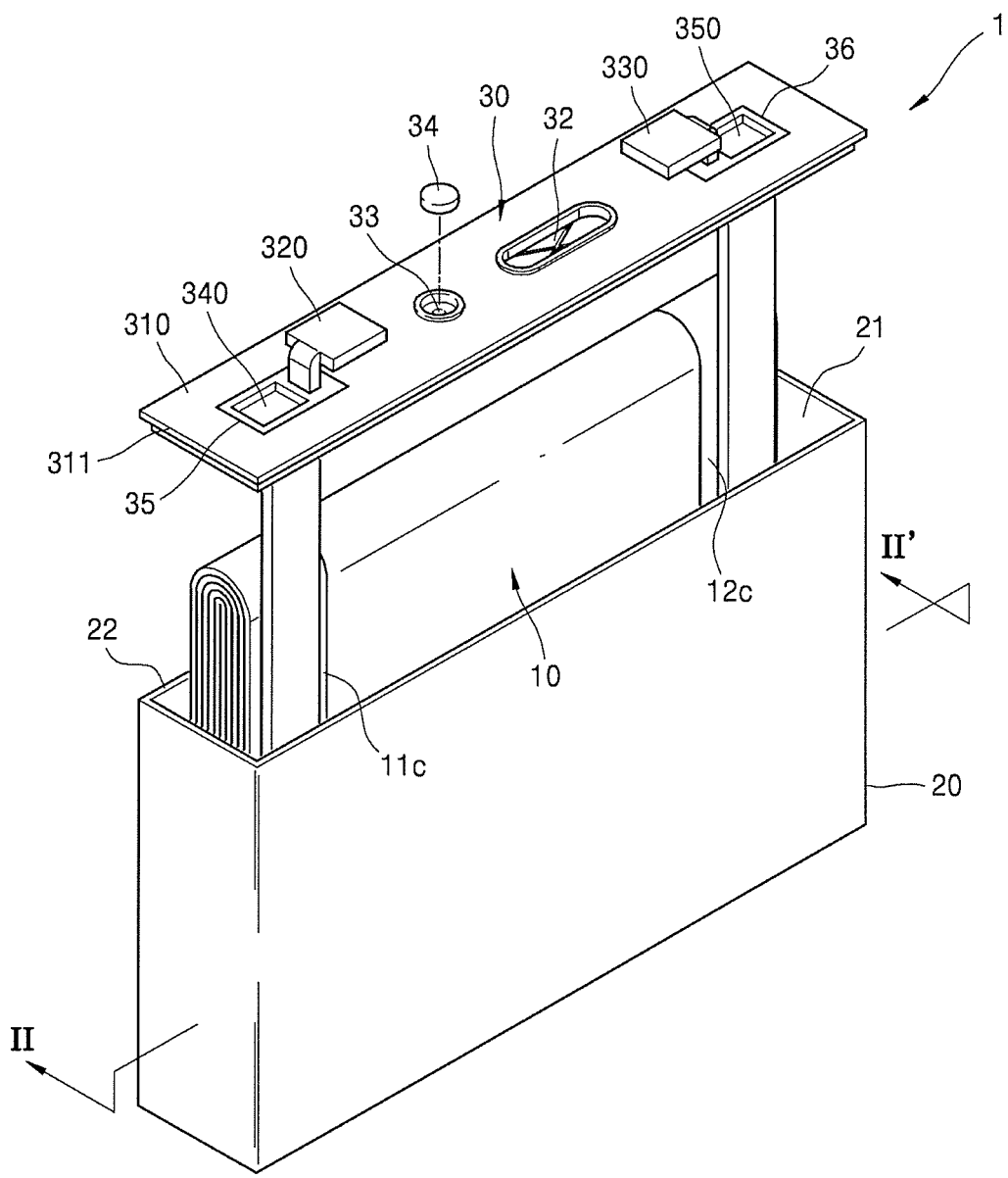
FIG. 1 is an exploded perspective view of a battery unit according to an embodiment of the present invention.

Reference will now be made in further detail to some embodiments of the present invention, examples of which are illustrated in the accompanying drawings, wherein like reference numerals refer to like elements throughout. In this regard, the present embodiments may have different forms and should not be construed as being limited to the descriptions set forth herein. As those skilled in the art would realize, the described embodiments may be modified in various different ways, all without departing from the spirit or scope of the present invention. Accordingly, the drawings and description are to be regarded as illustrative in nature and not restrictive.

As used herein, the term "and/or" includes any and all combinations of one or more of the associated listed items. Expressions such as "at least one of," when preceding a list of elements, modify the entire list of elements and do not modify the individual elements of the list.

FIG. 1 is an exploded perspective view of a battery unit according to an embodiment of the present invention. FIG. 2 is a cross-sectional view of the battery unit of FIG. 1, taken along the line II-II'. FIG. 3 is a perspective view illustrating an electrode assembly according to an embodiment of the present invention. Referring to FIGS. 1 through 3, a battery unit 1 according to an embodiment of the present invention includes an electrode assembly 10, a case 20 for accommodating the electrode assembly 10, and a cap assembly 30 for closing an upper end of the case 20.

The battery unit 1 may be a secondary battery, such as a lithium ion battery. The battery unit 1 may be of a variety of types, such as a cylindrical battery unit, a prismatic battery unit, or a polymer battery. However, the present invention is not limited to any one of the above types.

Referring to FIG. 3, the electrode assembly 10 may include a positive plate 11, a negative plate 12, and a separator 13 interposed between the positive plate 11 and the negative plate 12. For example, a stacked body of the positive plate 11, the negative plate 12, and the separator 13 may be wound in a jelly roll shape.

The positive plate 11 includes a positive current collector portion 11a and a positive active material layer 11b formed on at least one surface of the positive current collector portion 11a. A positive material uncoated portion 11c where the positive active material layer 11b is not coated is provided at an edge portion of the positive current collector portion 11a in a widthwise direction thereof. The negative plate 12 includes a negative current collector portion 12a and a negative active material layer 12b formed on at least one surface of the negative current collector portion 12a. A negative material uncoated portion 12c where the negative active material layer 12b is not coated is provided at an edge portion of the negative current collector portion 12a in a widthwise direction thereof. The positive material uncoated portion 11c and the negative material uncoated portion 12c may be arranged to be separated from each other in a widthwise direction of the electrode assembly 10. For example, the positive material uncoated portion 11c and the negative material uncoated portion 12c may be arranged at opposite edge portions of the electrode assembly 10 in the widthwise direction.

The cap assembly 30, in one embodiment, includes a cap plate 310, terminal members 320 and 330 that are electrically connected to the electrode assembly 10, and fixing members 340 and 350 for fixing the terminal members 320 and 330 on the cap plate 310.

An opening 21 for inserting the electrode assembly 10 is provided in the case 20. The opening 21 is closed as the cap plate 310 is coupled to the case 20. In one embodiment, an edge 311 of the cap plate 310 is shape-matched with an upper edge 22 of the case 20 that forms the opening 21. In this state, as the cap plate 310 is coupled to the case 20 by, for example, laser welding, a housing for accommodating the electrode assembly 10 is formed. A safety vent 32 may be provided on the cap plate 30. The safety vent 32 is designed to be breakable so as to provide a gas exhaust path when the internal pressure of the case 20 exceeds a preset point (e.g., a reference pressure). An electrolyte injection hole 33 for injecting an electrolyte into the case 20 may be provided on the cap plate 30. When the injection of an electrolyte is completed, the electrolyte injection hole 33 is closed by a sealing plug 34.

The terminal members 320 and 330 are a positive terminal member and a negative terminal member, respectively. Hereinafter, the terminal members 320 and 330 are respectively referred to as the positive terminal member 320 and the negative terminal member 330. The positive terminal member 320 and the negative terminal member 330 are respectively and electrically connected to the positive material uncoated portion 11c and the negative material uncoated portion 12c of the electrode assembly 10. The positive material uncoated portion 11c and the negative material uncoated portion 12c of the electrode assembly 10 are electrically exposed outside of the case 20 via the positive terminal member 320 and the negative terminal member 330. In one embodiment, terminal insertion portions 35 and 36 of the cap assembly 30 include a positive terminal insertion portion and a negative terminal insertion portion, respectively. The terminal insertion portions 35 and 36 are formed by vertically penetrating the cap plate 310. The positive terminal member 320 and the negative terminal member 330 are respectively inserted into the terminal insertion portions 35 and 36 and fixed on the cap plate 310 by the positive terminal fixing member 340 and the negative terminal fixing member 350.

FIG. 4 is a perspective view illustrating the negative (positive) terminal member 330 (320) according to an embodiment of the present invention. The terminal members 320 and 330 generally have the same shape or shapes symmetrical to each other. In FIG. 4, reference numerals of constituent elements forming the positive terminal member 320 are indicated in parentheses together with the reference numerals of constituent elements of the negative terminal member 330.

Referring to FIGS. 1, 2, and 4, the positive terminal member 320 may include a positive terminal portion 321, a positive current collector portion 324, and a positive connection portion 325 connecting the positive terminal portion 321 and the positive current collector portion 324. The negative terminal member 330 may include a negative terminal portion 331, a negative current collector portion 334, and a negative connection portion 335 connecting the negative terminal portion 331 and the negative current collector portion 334. In one embodiment, the negative terminal portion 331 and the positive terminal portion 321 extend parallel to an upper surface 312 of the cap plate 310. The positive terminal member 320 and the negative terminal member 330 may be formed of a metal having electrical conductivity. For example, the positive terminal member 320 and the negative terminal member 330 may be formed by cutting and bending a metal panel member into a desired shape by a pressing processing method.

The negative terminal portion 331 extends in a horizontal direction, that is, in a direction along a major side of the cap plate 310 (e.g., a first direction). The negative current collector portion 334 extends downward, that is, in a direction along a thickness direction of the cap plate 310 (e.g., a second direction). The negative connection portion 335 is bent from the negative terminal portion 331 so as to connect the negative terminal portion 331 and the negative current collector portion 334. The negative connection portion 335 may include a first negative bending portion 332 bent downward (e.g., in the second direction) from an edge 331a of the negative terminal portion 331 in an opposite direction (e.g., a third direction) to the first direction and extended therefrom and a second negative bending portion 333 bent in the third direction from an edge 332a of the first negative bending portion 332 in the second direction and extended therefrom. The negative current collector portion 334 may be bent downward (e.g., in the second direction) from an edge 333a of the second negative bending portion 333 in a direction crossing the first and second directions, that is, in a minor side direction (e.g., a fourth direction) of the cap plate 310, and extended therefrom.

According to the above-described structure, a large area portion 334b, not a thickness portion 334c, of the negative current collector portion 334 is located parallel to the negative material uncoated portion 12c of the electrode assembly 10. A width W of the large area portion 334b may be determined such that a contact area between the large area portion 334b and the negative material uncoated portion 12c is suitably large or as large as possible. Thus, a large contact area between the negative current collector portion 334 and the negative material uncoated portion 12c may be obtained and thus contact resistance may be small or reduced.

Figure 5A:
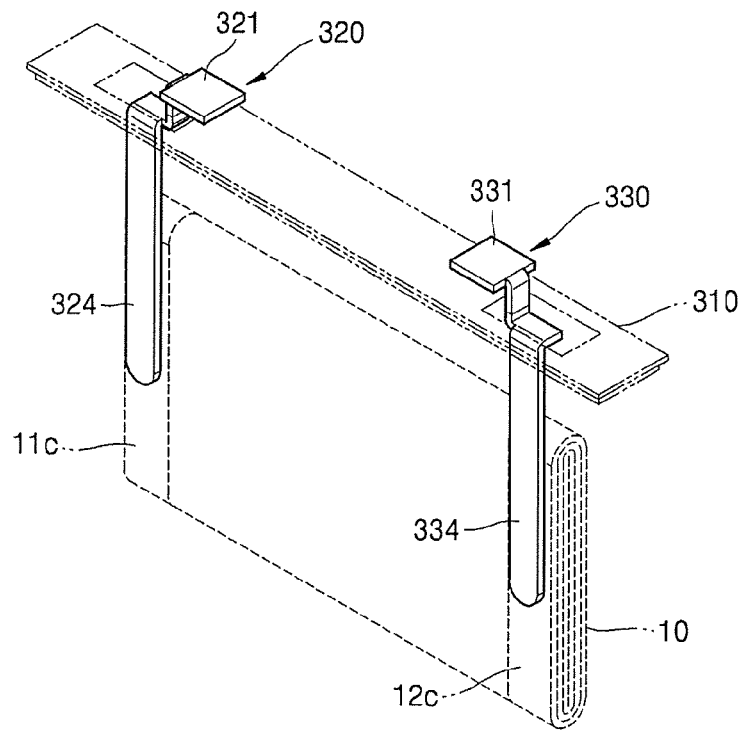
FIGS. 5A to 5C are perspective views illustrating arrangements of a positive current collector portion and a negative current collector portion that are connected on a same surface of an electrode assembly.
Figure 5B:
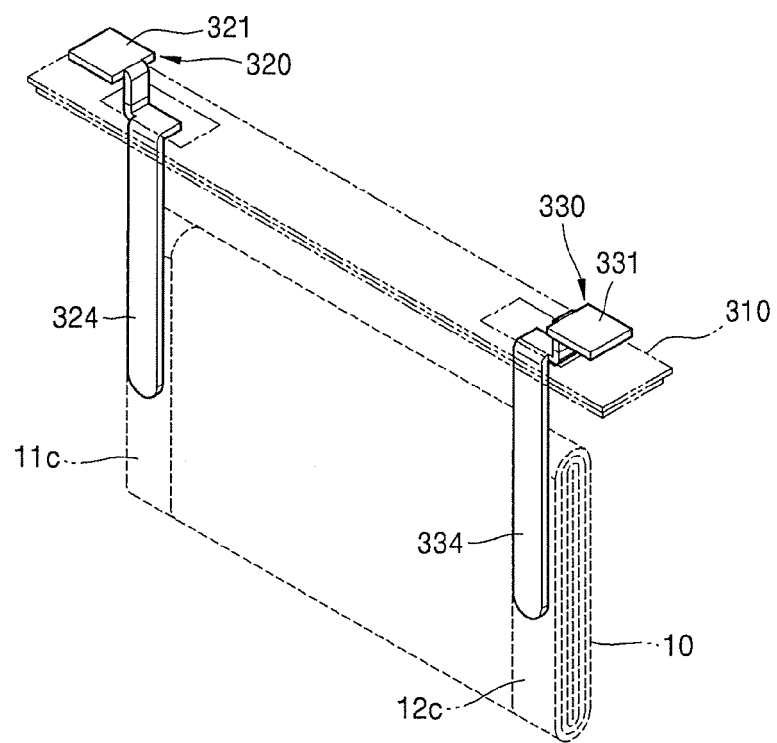
Figure 5C:
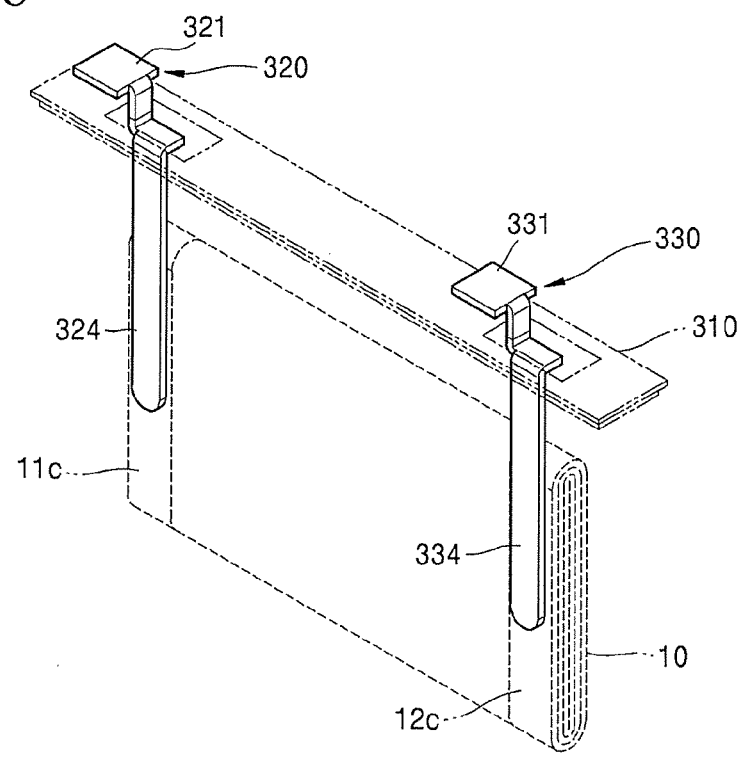

FIGS. 5A to 5C are perspective views illustrating arrangements of the positive terminal member 320 and the negative terminal member 330. In FIGS. 5A to 5C, the positive current collector portion 324 and the negative current collector portion 334 are connected on a same surface of the electrode assembly 10.

Referring to FIG. 5A, in one embodiment, the positive terminal member 320 and the negative terminal member 330 may be arranged such that the positive terminal portion 321 and the negative terminal portion 331 face each other. Referring to FIG. 5B, in another embodiment, the positive terminal member 320 and the negative terminal member 330 may be arranged such that the positive terminal portion 321 and the negative terminal portion 331 face opposite directions. In the embodiments shown in FIGS. 5A and 5B, the positive terminal member 320 and the negative terminal member 330 have symmetrical shapes with respect to the major side direction. Referring to FIG. 5C, in another embodiment, the positive terminal member 320 and the negative terminal member 330 may be arranged such that the positive terminal portion 321 and the negative terminal portion 331 face a same direction. In this embodiment, the shapes of the positive terminal member 320 and the negative terminal member 330 are the same.

Figure 6A:
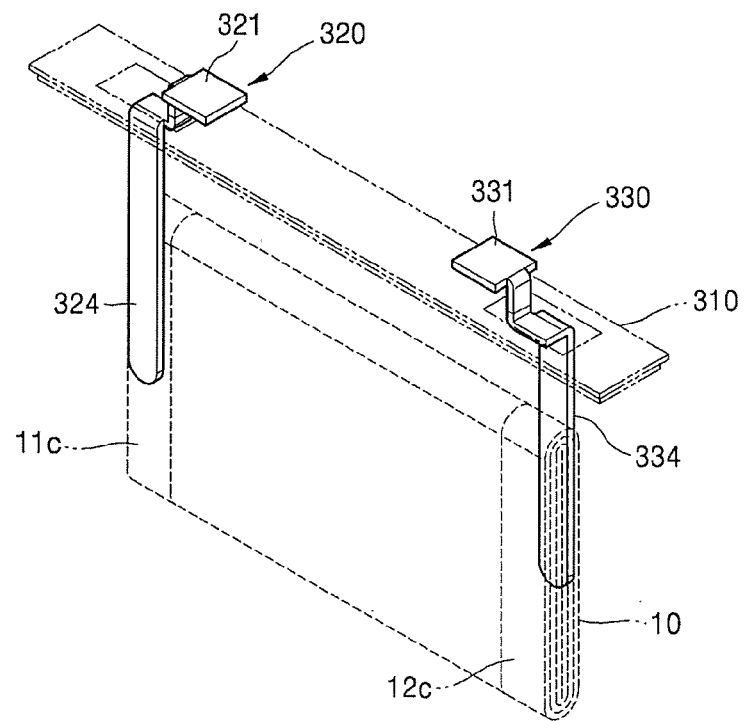
FIGS. 6A to 6C are perspective views illustrating arrangements of a positive current collector portion and a negative current collector portion that are connected on different surfaces of an electrode assembly.
Figure 6B:
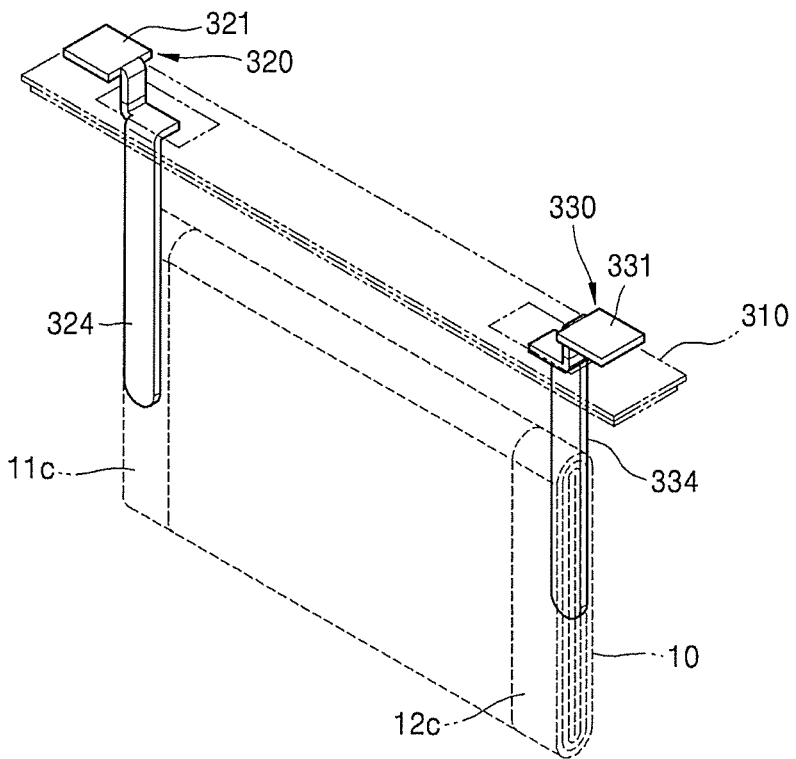
Figure 6C:
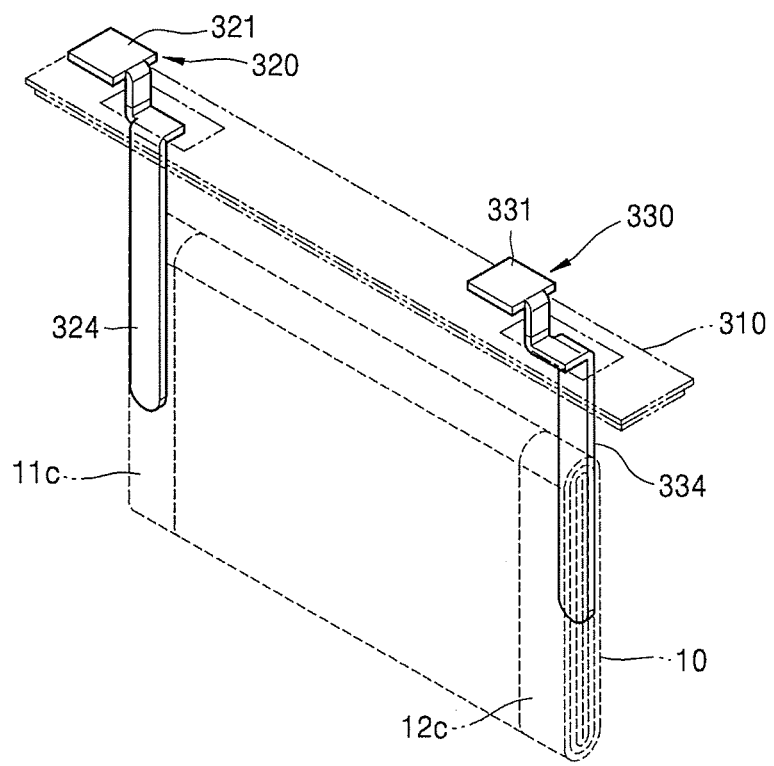

FIGS. 6A to 6C are perspective views illustrating arrangements of the positive current collector portion 324 and the negative current collector portion 334 in which the positive current collector portion 324 and the negative current collector portion 334 are connected on different surfaces of the electrode assembly 10. In the arrangements shown in FIGS. 6A and 6B, the positive terminal member 320 and the negative terminal member 330 have a same shape. In the arrangement shown in FIG. 6C, the shapes of the positive terminal member 320 and the negative terminal member 330 are symmetrical to each other with respect to the major side direction.

In embodiments in which the shape of the positive terminal member 320 is the same as that of the negative terminal member 330, as illustrated in FIG. 4, the positive terminal member 320 includes the positive terminal portion 321 extending in the first direction, the positive current collector portion 324 extending in the second direction, and the positive connection portion 325 that is bent from the positive terminal portion 321 and connects the positive terminal portion 321 and the positive current collector portion 324. The positive connection portion 325 may include a first positive bending portion 322 that is bent in the second direction from an edge 321a of the positive terminal portion 321 in the third direction and extended therefrom, and a second positive bending portion 323 that is bent in the third direction from an edge 322a of the first positive bending portion 322 in the second direction and extended therefrom. The positive current collector portion 324 may be bent in the second direction from an edge 323a of the second positive bending portion 323 in the fourth direction.

According to the above structure, a large area portion 324b, not a thickness portion 324c, of the positive current collector portion 324 is located parallel to the positive material uncoated portion 11c of the electrode assembly 10. The width W of the large area portion 324b may be determined such that a contact area between the large area portion 324b and the positive material uncoated portion 11c is suitably large or as large as possible. Thus, a large contact area between the positive current collector portion 324 and the positive material uncoated portion 11c may be obtained and thus contact resistance may be small or reduced.

When the shape of the positive terminal member 320 is symmetrical to the shape of the negative terminal member 330, as indicated by a dotted line of FIG. 4, the positive current collector portion 324 is bent in the second direction from an edge 323b of the second positive bending portion 323 in a direction (e.g., a fifth direction) that is opposite to the fourth direction and extended therefrom.

The positive terminal member 320 and the negative terminal member 330 are respectively inserted in the positive terminal insertion portion 35 and the negative terminal insertion portion 36. The positive terminal portion 321 and the negative terminal portion 331 are located above the cap plate 310, whereas the positive current collector portion 324 and the negative current collector portion 334 are located under the cap plate 310. In this state, the positive terminal member 320 and the negative terminal member 330 are fixed on the cap plate 310 by the positive terminal fixing member 340 and the negative terminal fixing member 350 that are respectively inserted into the positive terminal insertion portion 35 and the negative terminal insertion portion 36. The positive terminal fixing member 340 and the negative terminal fixing member 350 may be formed of, for example, an electrical insulation plastic. The positive terminal portion 321 and the negative terminal portion 331 protrude above from the cap plate 310. Gaps G1 and G2 (see FIG. 2) are respectively formed between the upper surface 312 of the cap plate 310 and the positive terminal portion 321 and the negative terminal portion 331. Accordingly, the positive terminal portion 321 and the negative terminal portion 331 are fixed on the cap plate 310 and the positive terminal portion 321 and the negative terminal portion 331 are electrically insulated from the cap plate 310 by the positive terminal fixing member 340 and the negative terminal fixing member 350, respectively.

The electrical insulation plastic of the positive terminal fixing member 340 and the negative terminal fixing member 350 may be, for example, one or more of common plastics, such as polyvinyl chloride (PVC), polystyrene, high density polyethylene, and acrylonitrile butadiene styrene copolymer (ABS), common engineering plastics, such as polyacetal, polyphenylene oxide (PPO), polyphenylene ether (PPE), polyamide (Pam), polycarbonate (PC), and polybutylene terephthalate (PBT), high performance engineering plastics, such as U polymer, polysulfone (PSF), polyphenylene sulfide (PPS), polyetherimide (PEI), polyethersulfone (PES), polyacrylate (PAR), polyetheretherketone (PEEK), and polytetrafluoroethylene (PTFE), and super heat resisting engineering plastics, such as polyamideimide (PAI) and polyimide (PI). For example, the positive terminal fixing member 340 and the negative terminal fixing member 350 may be formed of resin obtained by adding glass fiber to PPS by 40%.

Referring to FIG. 2, the positive terminal portion 321 and the negative terminal portion 331 are above and separated by a distance from the upper surface 312 of the cap plate 310, respectively forming the gaps G1 and G2 therebetween. The gaps G1 and G2, in one embodiment, may be the same. The positive terminal fixing member 340 and the negative terminal fixing member 350 may partially or entirely surround the positive connection portion 325 and the negative connection portion 335. In one embodiment, gaps between the positive connection portion 325 and the negative connection portion 335 and the positive terminal insertion portion 35 and the negative terminal insertion portion 36 of the cap plate 310 are filled with a resin that forms the positive terminal fixing member 340 and the negative terminal fixing member 350. Accordingly, the positive terminal member 320 and the negative terminal member 330 are electrically insulated (e.g., electrically and entirely insulated) from the cap plate 310. The second positive bending portion 323 and the second negative bending portion 333 may be partially or entirely (refer to a dashed line of FIG. 2) buried, or surrounded, in the positive terminal fixing member 340 and the negative terminal fixing member 350. As the positive connection portion 325 and the negative connection portion 335 having bending portions are buried in the positive fixing member 340 and the negative fixing member 350, the positive terminal member 320 and the negative terminal member 330 are coupled to the cap plate 310 by the positive terminal fixing member 340 and the negative terminal fixing member 350, and a coupling strength between the positive terminal member 320 and the negative terminal member 330 and the cap plate 310 may be improved.

The positive terminal fixing member 340 and the negative terminal fixing member 350, in one embodiment, may be formed by an insert injection molding method in which the positive terminal member 320 and the negative terminal member 330 are respectively inserted in the positive terminal insertion portion 35 and the negative terminal insertion portion 36, and then a resin of the above-described plastic is injected to be molded into the positive terminal insertion portion 35 and the negative terminal insertion portion 36. An example of the insert injection molding method is described further later with reference to FIGS. 9A to 9C.

Figure 7:
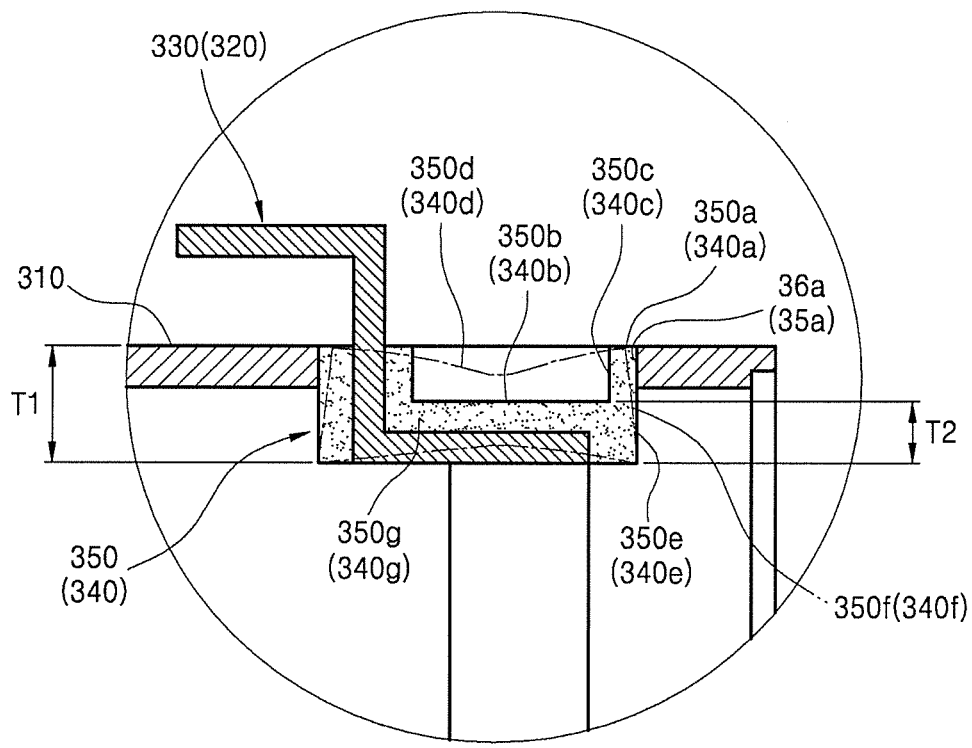
FIG. 7 is a cross-sectional view illustrating a fixing member according to an embodiment of the present invention.

FIG. 7 illustrates in further detail a region "B" of FIG. 2. Referring to FIG. 7, the negative fixing member 350 includes a recessed portion 350d that is recessed downwardly from an upper surface 350a of the negative terminal fixing member 350. The recessed portion 350d, in one embodiment, may be defined by a stepped surface 350b stepped downwardly from the upper surface 350a and an inner side surface 350c that forms a boundary or extends between the stepped surface 350b and the upper surface 350a. A side wall 350f extending upward from the stepped surface 350b is defined by the upper surface 350a, the inner side surface 350c, and an outer side surface 350e that forms a boundary with the edge 36a of the negative terminal insertion portion 36. Accordingly, the negative terminal fixing member 350 includes the side wall 350f extending upwardly from a lower wall 350g and has a "U" shape in which the recessed portion 350d is formed between the side wall 350f and the lower wall 350g. The side wall 350f is coupled to an edge 36a of the negative terminal insertion portion 36. The second negative bending portion 333 may be partially or entirely buried in the lower wall 350g.

According to the above structure, the thickness of the negative fixing member 350 may be thin and uniform (e.g., entirely thin and uniform). The uniform thickness may prevent or substantially prevent deformation of the negative fixing member 350 that may occur in a process in which the negative terminal fixing member 350 is cooled after injection molding. For example, if the recessed portion 350d were not formed, the thickness would be relatively thick, as illustrated by a thickness T1. In this case, while the negative terminal fixing member 350 is cooled after injection, the center portion of the negative terminal fixing member 350 would be cooled more slowly than an edge portion thereof and thus the center portion would be contracted compared to the edge portion, as illustrated by a dashed/dotted line in FIG. 7. Then, the edge portion may be partially lifted off from the negative terminal insertion portion 36 and thus the negative terminal member 330 may be inclined and the coupling strength between the negative terminal member 330 and the cap plate 310 may be decreased. Also, a gap may be generated between the negative terminal insertion portion 36 and the negative terminal fixing member 350. According to the negative terminal fixing member 350 illustrated in FIG. 7, because the recessed portion 350d is formed, the thickness of the negative terminal fixing member 350 decreases to be uniform (e.g., entirely uniform), as indicated by a thickness T2. Deformation after injection and other problems may thereby be avoided.

Likewise, the positive terminal fixing member 340 may include a recessed portion 340d that is recessed downwardly from an upper surface 340a of the positive terminal fixing member 340. The recessed portion 340d, in one embodiment, may be defined by a stepped surface 340b stepped downwardly from the upper surface 340a and an inner side surface 340c that forms a boundary or extends between the stepped surface 340b and the upper surface 340a. A side wall 340f extending upward from the stepped surface 340b is defined by the upper surface 340a, the inner side surface 340c, and an outer side surface 340e that forms a boundary with the positive terminal insertion portion 35. Accordingly, the positive terminal fixing member 340 includes the side wall 340f extending upward from a lower wall 340g and has a "U" shape in which the recessed portion 340d is formed between the side wall 340f and the lower wall 340g. The side wall 340f is coupled to an edge 35a of the positive terminal insertion portion 35. The second positive bending portion 323 may be partially or entirely buried in the lower wall 340g.

Figure 8:
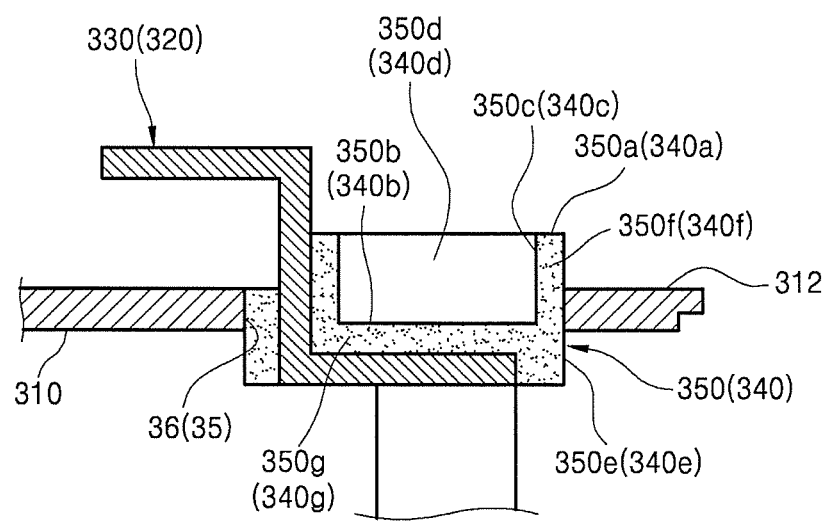
FIG. 8 is a cross-sectional view illustrating a fixing member according to another embodiment of the present invention.

In one embodiment, the upper surfaces 340a and 350a of the positive and negative terminal fixing members 340 and 350 may be a same surface as the upper surface 312 of the cap plate 310, as illustrated in FIG. 7. In another embodiment, as illustrated in FIG. 8, the side walls 340f and 350f may be extended upward over the upper surface 312 of the cap plate 310, such that the upper surfaces 340a and 350a are located above the upper surface 312 of the cap plate 310. As such, as the upper surfaces 340a and 350a extend upward, contact areas between the positive terminal member 320 and the negative terminal member 330, that is, the first positive bending portion 322 and the first negative bending portion 332, and the positive terminal fixing member 340 and the negative terminal fixing member 350 are increased such that the coupling strength may be improved. The recessed portions 340d and 350d prevent or substantially prevent the thicknesses of the lower walls 340g and 350g from being overly increased when the side walls 340f and 350f extend upward, thereby preventing or substantially preventing deformation after the injection of the positive terminal fixing member 340 and the negative terminal fixing member 350.

Figure 9A:
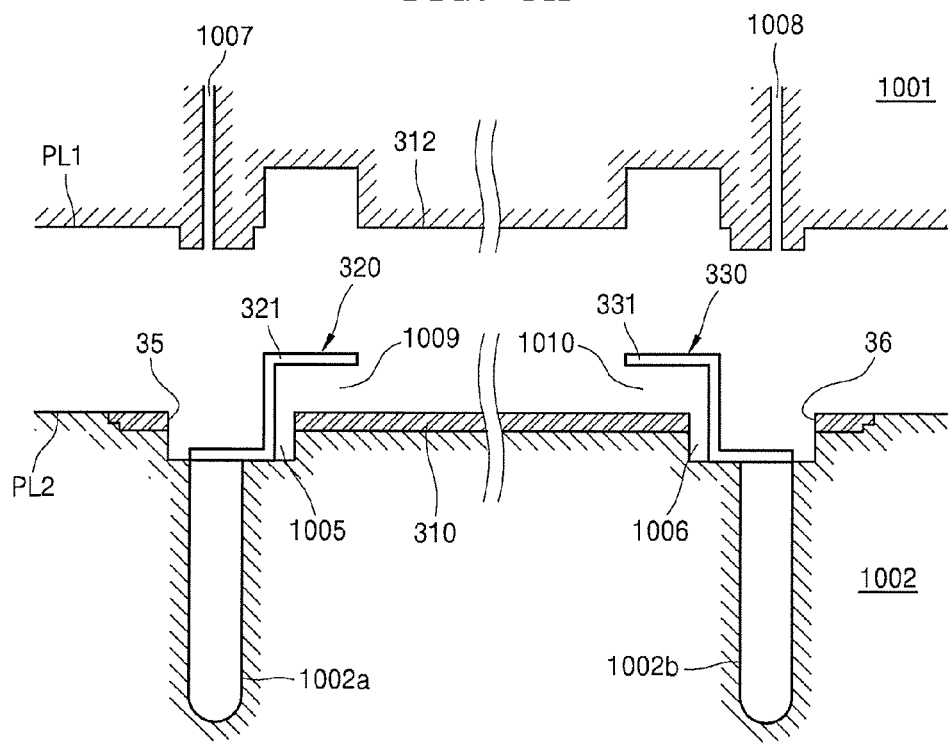
FIGS. 9A to 9C illustrate an example of a process of fixing a positive terminal member and a negative terminal member on a cap plate while forming a fixing member in an insert injection molding method.
Figure 9B:
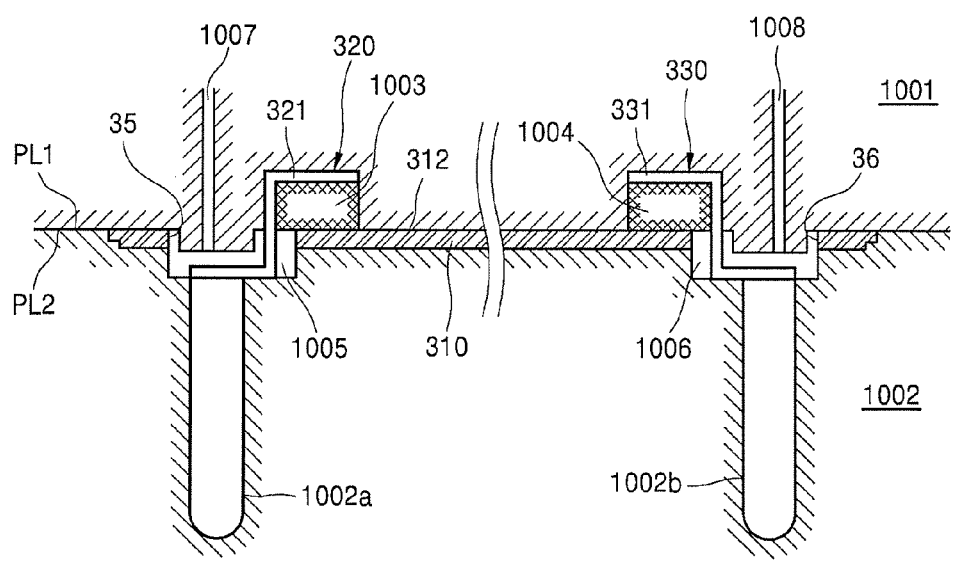
Figure 9C:
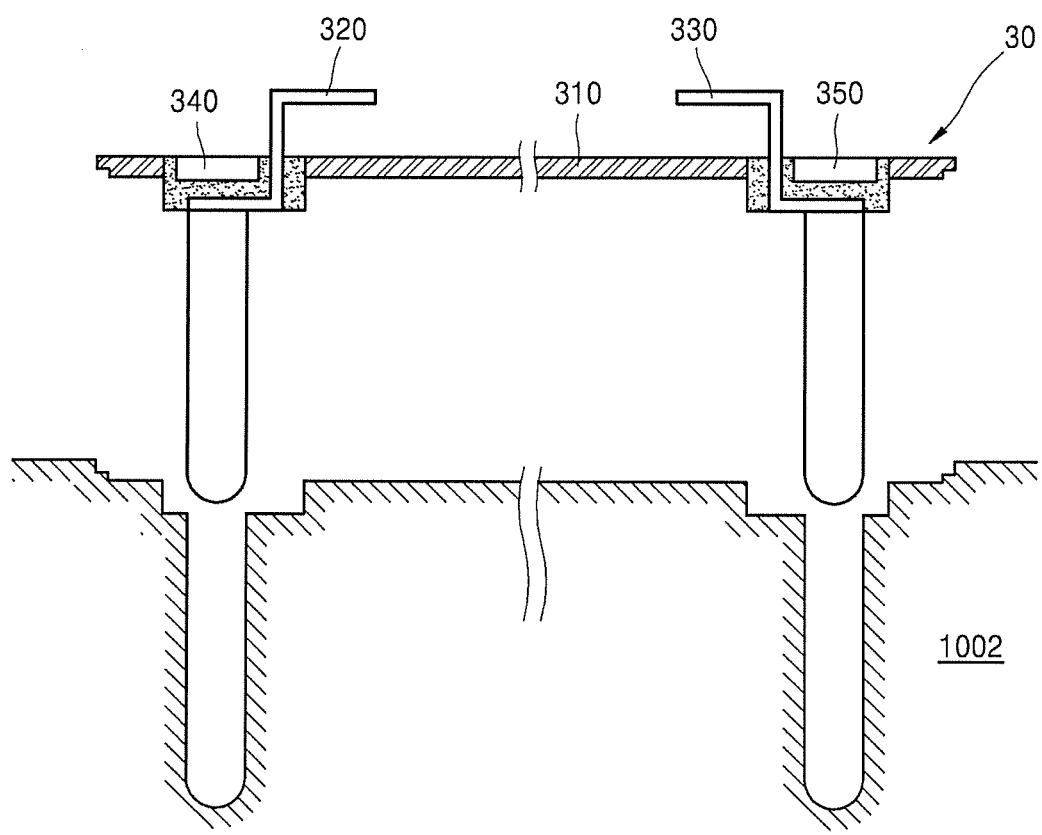

FIGS. 9A to 9C illustrate an example of a process of fixing the positive terminal member 320 and the negative terminal member 330 on the cap plate 310 while forming the positive and negative terminal fixing members 340 and 350 in an insert injection molding method.

Referring to FIG. 9A, when an upper core 1001 and a lower core 1002 of an injection mold are separated from each other, that is, the injection mold is opened, the cap plate 310 is placed on a lower parting line PL2 of the lower core 1002, and the positive terminal member 320 and the negative terminal member 330 are inserted into the lower core 1002 by passing through the cap plate 310 via the positive terminal insertion portion 35 and the negative terminal insertion portion 36, respectively. Support holes 1002a and 1002b for respectively supporting the positive current collector portion 324 and the negative current collector portion 334 are provided in the lower core 1002. When the positive current collector portion 324 and the negative current collector portion 334 are respectively supported by the support holes 1002a and 1002b, the positive terminal portion 321 and the negative terminal portion 331 are located to be separated from the upper surface 312 of the cap plate 310. To prevent or substantially prevent gaps 1009 and 1010 between the positive terminal portion 321 and the negative terminal portion 331 and the upper surface 312 of the cap plate 310 from being filled with the plastic resin, the gaps 1009 and 1010, in one embodiment, are filled with the upper core 1001. The gaps 1009 and 1010 correspond to under-cut portions with respect to an operation direction of the upper core 1001. The gaps 1009 and 1010, in one embodiment, may be filled with slide cores 1003 and 1004 (see FIG. 9B) that move in a direction crossing the operation direction when the upper core 1001 is operated. In other words, when the upper core 1001 approaches or is separated from the lower core 1002 in an operation direction, the slide cores 1003 and 1004 may move in the direction crossing the operation direction of the upper core 1001 so as to fill or be moved away from the gaps 1009 and 1010.

Referring to FIG. 9B, the upper core 1001 approaches the lower core 1002 when the cap plate 310, the positive terminal member 320, and the negative terminal member 330 are supported on the lower core 1002. When the upper core 1001 and the lower core 1002 are coupled to each other, molding spaces 1005 and 1006 where the positive terminal fixing member 340 and the negative terminal fixing member 350 are to be formed are defined by an upper parting line PL1 and the lower parting line PL2. The gaps 1009 and 1010 are filled by the slide cores 1003 and 1004, respectively. The molding spaces 1005 and 1006 are filled with resin through gates 1007 and 1008, respectively. When a cooling time (e.g., a predetermined cooling time) passes, the resin filling the molding spaces 1005 and 1006 is cured and thus the positive terminal fixing member 340 and the negative terminal fixing member 350 for fixing the positive terminal member 320 and the negative terminal member 330 on the cap plate 310 are formed.

Next, referring to FIG. 9C, the upper core 1001 is separated from the lower core 1002 and the cap assembly 30 is separated from the lower core 1002. When the formation of the cap assembly 30 is completed, the electrode assembly 10, the positive terminal member 320, and the negative terminal member 330 are electrically connected to one another. The positive current collector portion 324 is electrically connected to the positive material uncoated portion 11c, and the negative current collector portion 334 is electrically connected to the negative material uncoated portion 12c. The coupling of the positive current collector portion 324 to the positive material uncoated portion 11c and the coupling of the negative current collector portion 334 to the negative material uncoated portion 12c may be performed by, for example, ultrasonic welding.

When the cap assembly 30 and the electrode assembly 10 are coupled to each other, the electrode assembly 10 is inserted into the case 20 through the opening 21. As the cap plate 310 is coupled to the case 20 by, for example, a laser welding method, the opening 21 is closed, and the electrode assembly 10 is electrically exposed to the outside of the case 20 via the positive terminal member 320 and the negative terminal member 330. After an electrolyte is injected through the electrolyte injection hole 33, the electrolyte injection hole 33 is closed by using the sealing plug 34 and thus the manufacturing of the battery unit 1 may be completed.

According to the above-described battery unit 1, in one embodiment, each of the positive terminal member 320 and the negative terminal member 330 may be formed by a single metal plate. In other words, all components of each of the positive terminal member 320 and the negative terminal member 330 from the positive current collector portion 324 and the negative current collector portion 334 to the positive terminal portion 321 and the negative terminal portion 331, respectively, may be formed of the same metal. Thus, since the positive terminal member 320 and the negative terminal member 330 may be formed without a coupling process, such as welding, etc., the manufacturing cost may be reduced and also an electrical characteristic of a current path from each of the positive current collector portion 324 and the negative current collector portion 334 to the respective positive terminal portion 321 and the negative terminal portion 331 may be uniform or substantially uniform. Since the positive terminal member 320 and the negative terminal member 330 are coupled to the cap plate 310 by the insert injection molding method by using a plastic resin, the coupling between the cap plate 310 and the positive terminal member 320 and the negative terminal member 330 and the electrical insulation therebetween may be concurrently or simultaneously obtained. Also, since the positive terminal portion 321 and the negative terminal portion 331 are horizontally extended, that is, the positive terminal portion 321 and the negative terminal portion 331 are parallel with each other and with the upper surface 312 of the cap plate 310, when a battery module 2 (see FIG. 10) is formed by a combination of a plurality of the battery units 1, as described below, the positive terminal portion 321 and the negative terminal portion 331 of the battery units 1 that neighbor one another may be easily connected. Also, the positive terminal portion 321 and the negative terminal portion 331 in a horizontally extended form provide a sufficient area and facilitate welding thereto.

According to an embodiment of the present invention, since the positive terminal fixing member 340 and the negative terminal fixing member 350 including the recessed portions 340d and 350d are employed, problems such as a defect in the position alignment of the positive terminal member 320 and the negative terminal member 330 due to deformation after injection, a decrease in the coupling strength between the cap plate 310 and each of the positive terminal member 320 and the negative terminal member 330, and generation of a gap between the positive terminal insertion portion 35 and the negative terminal insertion portion 36 and the positive terminal fixing member 340 and the negative terminal fixing member 350 may be avoided.

Figure 10:
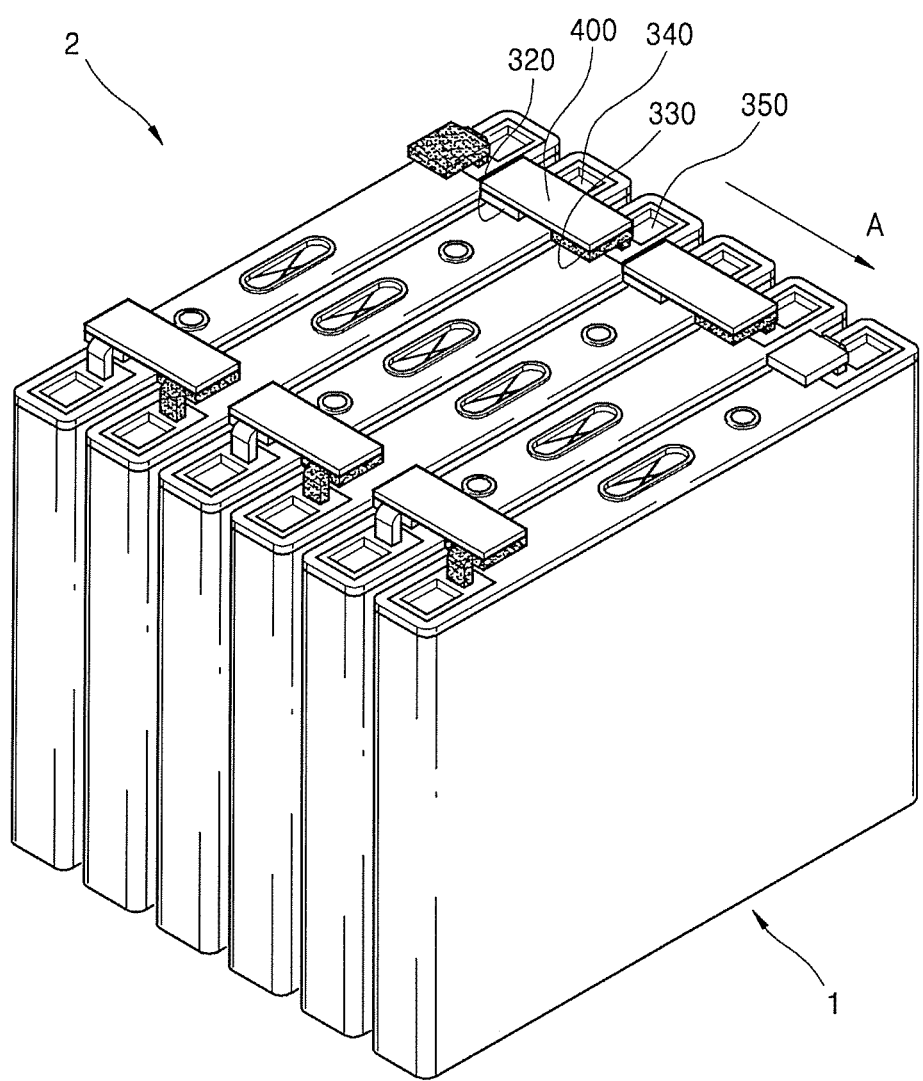
FIG. 10 is a perspective view of a battery module according to an embodiment of the present invention.

FIG. 10 is a perspective view of a battery module according to an embodiment of the present invention. Referring to FIG. 10, the battery module 2 may include a plurality of the battery units 1 arranged in a row. For example, the battery module 2 may include the battery units 1 arranged in one direction or a stacked structure including the battery units 1 arranged in one or more rows.

The battery units 1 may be electrically connected to one another serially or in parallel by connecting the positive terminal portion 321 and the negative terminal portion 331 of neighboring battery units 1. For example, as illustrated in FIG. 10, the battery units 1 may be serially connected to each other by connecting the terminal portions of different polarities of a pair of neighboring battery units 1 by using a bus bar 400. In one embodiment, the battery units 1 may be arranged such that the polarities of the terminal portions thereof are alternately arranged in a connection direction "A" of the bus bar 400. The bus bar 400 may be coupled to the positive terminal portion 321 and the negative terminal portion 331 by welding, for example. Although not illustrated in FIG. 10, the battery units 1 may be connected to each other in parallel by connecting the terminal portions of the same polarity of a pair of neighboring battery units 1 by using the bus bar 400.

The bus bar 400 may be formed of a metal material exhibiting high or superior conductivity. In one embodiment, the bus bar 400 may be formed of a metal material having a uniform composition. When the positive terminal portion 321 and the negative terminal portion 331 each are formed of a metal similar to that of the bus bar 400, each of the positive terminal portion 321 and the negative terminal portion 331 and the bus bar 400 may be coupled by welding between the similar metals. The similar metal may be, for example, aluminum (Al) and copper (Cu).

The positive terminal portion 321 and the negative terminal portion 331 may be formed of dissimilar metals. When the bus bar 400 is formed of a metal material different from those of the positive terminal portion 321 and the negative terminal portion 331, the coupling between dissimilar metals may be formed between the positive terminal portion 321 and the bus bar 400 and between the negative terminal portion 331 and the bus bar 400. When the bus bar 400 is formed of a similar metal as any one of the positive terminal portion 321 and the negative terminal portion 331, the coupling between dissimilar metals may be formed between the bus bar 400 and the other one of the positive terminal portion 321 and the negative terminal portion 331.

For example, a sufficient welding strength may be obtained through laser welding between the similar metals, for example, Al-Al or Cu-Cu. However, if the laser welding is applied between dissimilar metals such as Al-Cu, weldability is degraded such that a sufficient welding strength may not be obtained. Friction stir welding (FSW) may be performed between dissimilar metals instead of laser welding. FSW uses a welding tool (not shown) inserted in a base member while being rotated at a high speed. The base members around the welding tool are softened due to frictional heat between the welding tool and the base members. Plastic flow by an agitation operation by the rotating welding tool allows two base members to be forcibly mixed with each other with respect to a boundary surface of the two base members. Thus, FSW may provide a sufficient welding strength between dissimilar metals that have decreased weldability.

In one embodiment, for example, the positive terminal portion 321 may be formed of Al that is electrochemically suitable for a positive electrode, the negative terminal portion 331 may be formed of Cu that is electrochemically suitable for a negative electrode, and the bus bar 400 may be formed of Al. The positive terminal portion 321 and the bus bar 400 may be coupled by laser welding, whereas the negative terminal portion 331 and the bus bar 400 may be coupled by FSW. Accordingly, a sufficient welding strength may be obtained between the bus bar 400 and each of the positive terminal portion 321 and the negative terminal portion 331. In another embodiment, both the positive terminal portion 321 and the negative terminal portion 331 may be coupled to the bus bar 400 by FSW.

Figure 11:
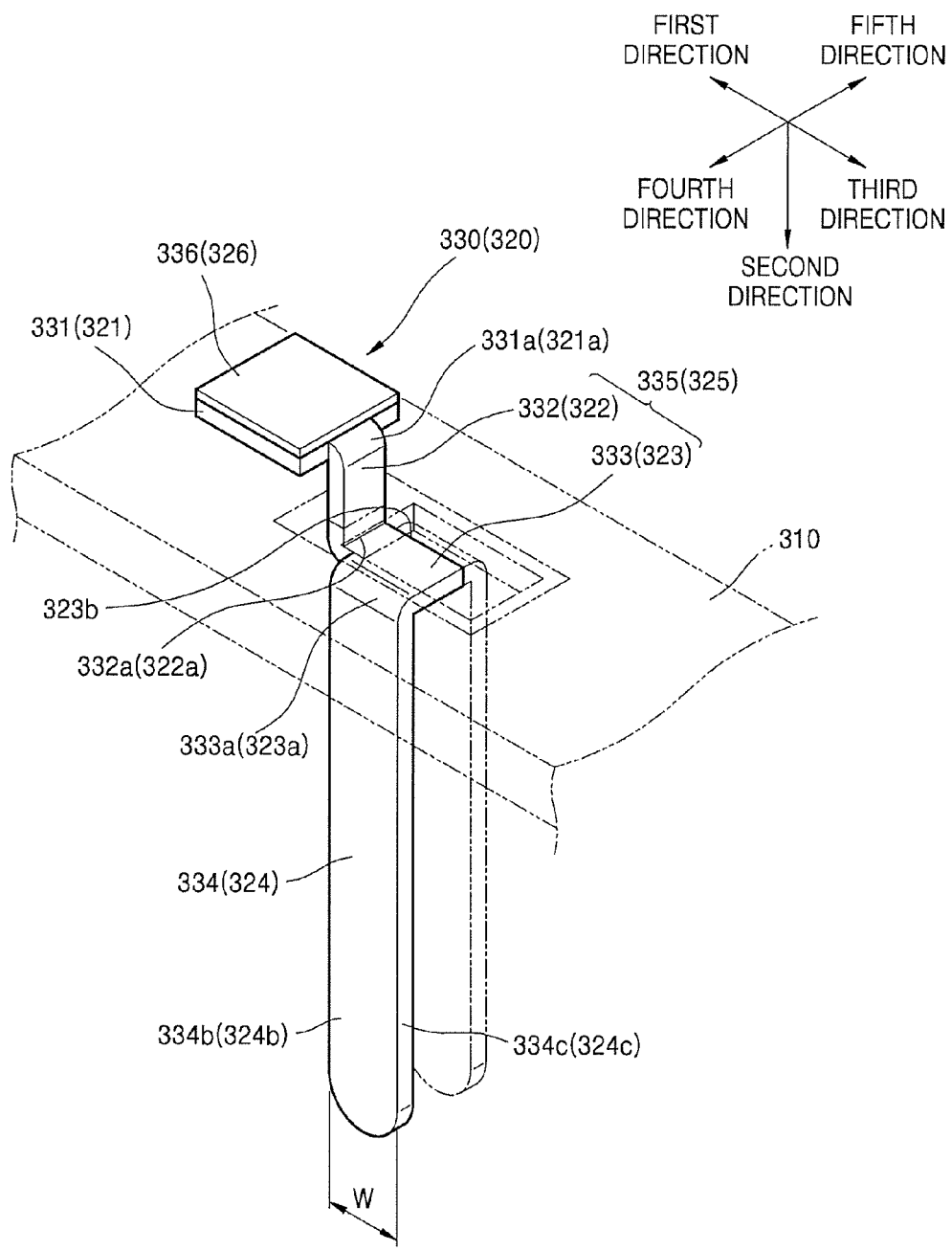
FIG. 11 is a perspective view of terminal members according to another embodiment of the present invention.

FIG. 11 is a perspective view of the positive terminal member 320 and the negative terminal member 330 applied to the battery unit 1, according to another embodiment of the present invention. When the positive terminal portion 321 and the negative terminal portion 331 are formed of dissimilar metals, and the bus bar 400 is formed of a metal that is the same as any one of the positive terminal portion 321 and the negative terminal portion 331, a welding layer 326 or 336 formed of a similar metal to the bus bar 400 may be provided on the other one of the positive terminal portion 321 and the negative terminal portion 331. For example, when the positive terminal portion 321 is formed of Al that is electrochemically suitable for a positive electrode, the negative terminal portion 331 may be formed of Cu that is electrochemically suitable for a negative electrode, and the bus bar 400 may be formed of Al, the welding layer 336 formed of Al that is the same material as the bus bar 400 may be provided on an upper surface of the negative terminal member 330. When the bus bar 400 is formed of Cu, the welding layer 326 formed of Cu that is the same material as the bus bar 400 may be provided on the upper surface of the positive terminal portion 321. The welding layers 326 and 336 may be respectively formed on one or more of the positive terminal portion 321 and the negative terminal portion 331 by laser welding or FSW, for example. In one embodiment, the gaps G1 and G2 described above and shown in FIG. 2 may initially be different such that the final heights of the upper surfaces of the positive terminal portion 321 and the negative terminal portion 331 after the welding layer 326, 336 is provided are the same. According to the above structure, since the coupling between the bus bar 400 and each of the positive terminal portion 321 and the negative terminal portion 331 is a coupling between similar metals, a sufficient welding strength may be obtained, even by laser welding.

Figure 12:
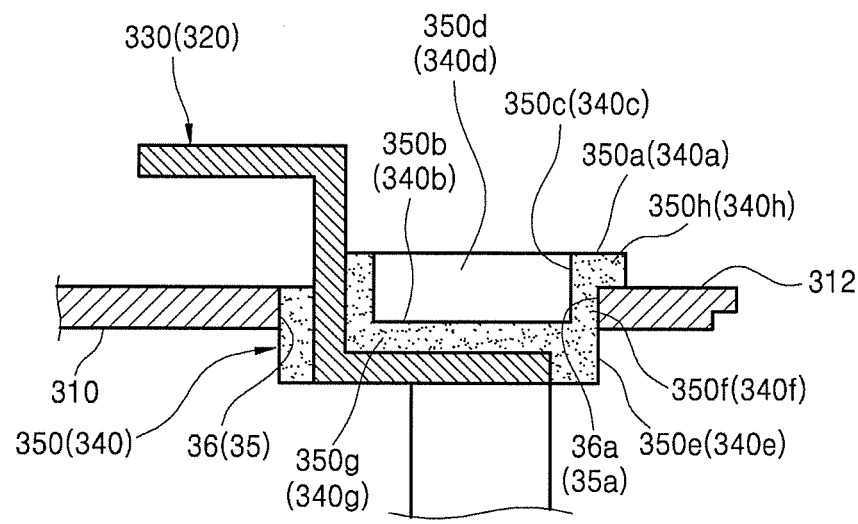
FIG. 12 is a cross-sectional view illustrating fixing members according to another embodiment of the present invention.

FIG. 12 is a cross-sectional view illustrating the positive fixing member 340 and the negative fixing member 350, according to another embodiment of the present invention. Referring to FIG. 12, the side walls 340f and 350f of the positive terminal fixing member 340 and the negative terminal fixing member 350 extend upward over the upper surface 312 of the cap plate 310. Also, extended portions 340h and 350h extend externally or outward from the side walls 340f and 350f from the edges 35a and 36a of the positive terminal insertion portion 35 and the negative terminal insertion portion 36 and are supported on the upper surface 312 of the cap plate 310. According to the above structure, the coupling strength between the cap plate 310 and each of the positive terminal member 320 and the negative terminal member 330 may be increased. Since the extended portions 340h and 350h increase the contact area between the positive terminal fixing member 340 and the negative terminal fixing member 350 and the cap plate 310, the coupling strength between the cap plate 310 and each of the positive terminal member 320 and the negative terminal member 330 may be increased. Also, when the bus bar 400 is coupled to the positive terminal portion 321 and the negative terminal portion 331 by welding, for example, pressure may be applied downwardly to the positive terminal portion 321 and the negative terminal portion 331 by the welding tool. In this state, since the extended portions 340h and 350h are supported on the upper surface 312 of the cap plate 310, the possibility of separation of the positive terminal fixing member 340 and the negative terminal fixing member 350 from the positive terminal insertion portion 35 and the negative terminal insertion portion 36 may be reduced. Also, since the extended portions 340h and 350h extend over the edges 35a and 36a of the positive terminal insertion portion 35 and the negative terminal insertion portion 36, the intrusion of moisture into the case 20 through a gap between the positive terminal fixing member 340 and the positive terminal insertion portion 35 or between the negative terminal fixing member 350 and the negative terminal insertion portion 36 may be reduced such that the possibility of corrosion of the cap plate 310, the electrode assembly 10, the positive and negative current collector portions 324 and 334, and the case 20 is reduced.

Figure 13:
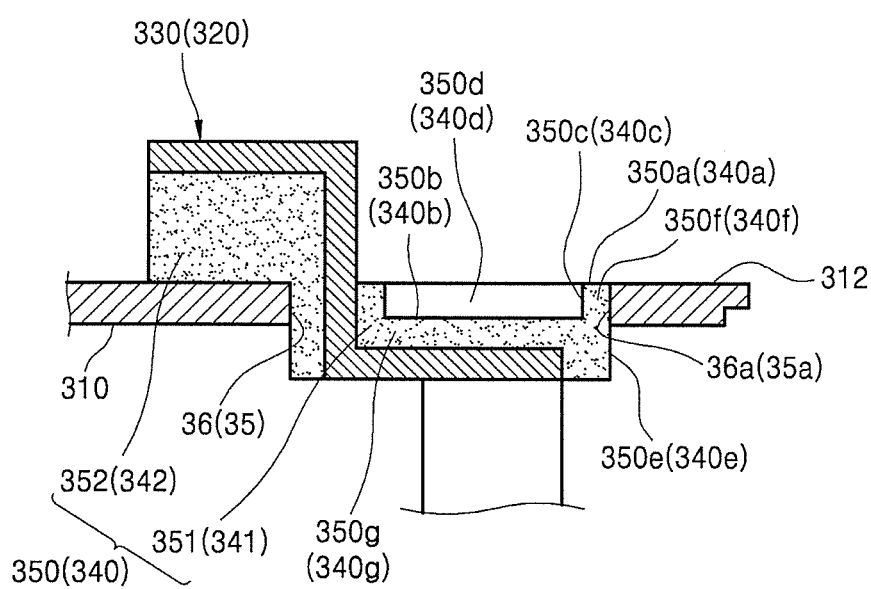
FIG. 13 is a cross-sectional view illustrating fixing members according to another embodiment of the present invention.
Figure 14:
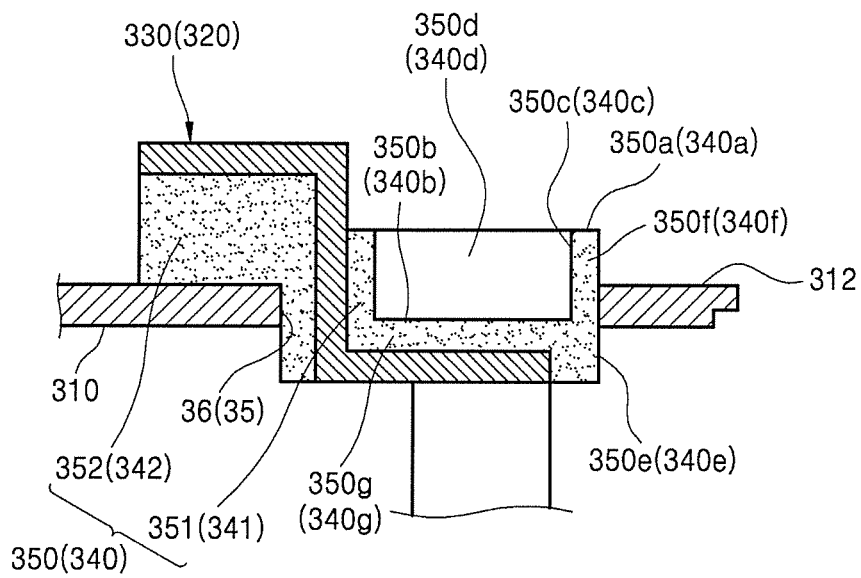
FIG. 14 is a cross-sectional view illustrating fixing members according to another embodiment of the present invention.
Figure 15:
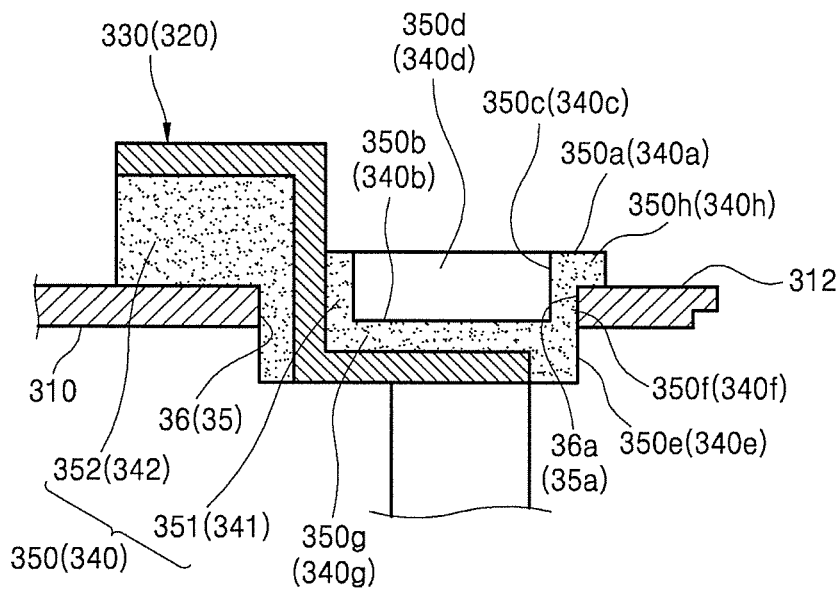
FIG. 15 is a cross-sectional view illustrating fixing members according to another embodiment of the present invention.

FIGS. 13, 14, and 15 are cross-sectional views illustrating the positive terminal fixing member 340 and the negative terminal fixing member 350, according to other embodiments of the present invention. Referring to FIGS. 13, 14, and 15, the positive terminal fixing member 340 and the negative terminal fixing member 350 are different from those in the embodiments of FIGS. 7, 8, and 12 in that the insides of the positive terminal insertion portion 35 and the negative terminal insertion portion 36 and the gaps G1 and G2 between each of the positive terminal portion 321 and the negative terminal portion 331 and the upper surface 312 of the cap plate 310 are filled with resin. In other words, the positive terminal fixing member 340 and the negative terminal fixing member 350 respectively include first fixing portions 341 and 351 that fill the positive terminal insertion portion 35 and the negative terminal insertion portion 36 and second fixing portions 342 and 352 that fill the gaps G1 and G2 between each of the positive terminal portion 321 and the negative terminal portion 331 and the upper surface 312 of the cap plate 310. The first fixing portions 341 and 351 may have the same shapes as those of the positive terminal fixing member 340 and the negative terminal fixing member 350 illustrated in FIGS. 7, 8, and 12.

The positive terminal fixing member 340 and the negative terminal fixing member 350 of the embodiments shown in FIGS. 13, 14, and 15 may be formed by the insert injection molding method. For example, the positive terminal fixing member 340 and the negative terminal fixing member 350 illustrated in FIGS. 13, 14, and 15 may be formed without using the slide cores 1003 and 1004 of the injection mold illustrated in FIG. 9B.

According to the embodiments shown in FIGS. 13, 14, and 15, the coupling strength between the cap plate 310 and each of the positive terminal member 320 and the negative terminal member 330 may be increased. Since the second fixing portions 342 and 352 increase the contact areas between the positive terminal member 320 and the negative terminal member 330, the cap plate 310, and the positive terminal fixing member 340 and the negative terminal fixing member 350, the coupling strength between the cap plate 310 and each of the positive terminal member 320 and the positive terminal fixing member 340 may be increased. Also, when the bus bar 400 is coupled to the positive terminal portion 321 and the negative terminal portion 331 by a method such as welding, a downward pressure may be applied by the welding tool to the positive terminal portion 321 and the negative terminal portion 331. In this state, since the positive terminal portion 321 and the negative terminal portion 331 are supported on the cap plate 310 by the second fixing portions 342 and 352, the possibility of separation of the positive terminal fixing member 340 and the negative terminal fixing member 350 from the positive terminal insertion portion 35 and the negative terminal insertion portion 36 may be reduced.

In the welding process, heat transferred to the positive terminal portion 321 and the negative terminal portion 331 may be distributed through the second fixing portions 342 and 352.

According to the embodiments shown in FIGS. 13, 14, and 15, since the positive terminal portion 321 and the negative terminal portion 331 are supported by the second fixing portions 342 and 352, the positive terminal portion 321 and the negative terminal portion 331 may be prevented or substantially prevented from being bent downwardly in the processing of welding the bus bar 400. Accordingly, the coupling quality between the bus bar 400 and each of the positive terminal portion 321 and the negative terminal portion 331 may be improved. Also, electrical insulation between the cap plate 310 and each of the positive terminal member 320 and the negative terminal member 330 may be improved.

While the present invention has been particularly shown and described with reference to some exemplary embodiments thereof, it will be understood by those of ordinary skill in the art that various changes in form and details may be made therein without departing from the spirit and scope of the present invention as defined by the following claims and equivalents thereof. Descriptions of features or aspects within each embodiment should typically be considered as available for other similar features or aspects in other embodiments.

What is claimed is:

1. A battery unit comprising:
   a case accommodating an electrode assembly and having an opening;
   a cap plate covering the opening and having a terminal insertion portion penetrating the cap plate;
   a terminal member extending into the case through the terminal insertion portion to electrically expose the electrode assembly outside of the case, the terminal member comprising:
     a current collector portion electrically connected to the electrode assembly;
     a terminal portion exposed outside of the cap plate; and
     a connection portion connecting the current collector portion and the terminal portion; and
   a fixing member in the terminal insertion portion and fixing the terminal member to the cap plate, the fixing member being formed by an insert injection molding method in which a plastic resin is injected in the terminal insertion portion in a state in which the terminal member is inserted in the terminal insertion portion,
   wherein the fixing member comprises a recessed portion that is recessed from an upper surface of the fixing member and is spaced from the terminal portion.

2. The battery unit of claim 1, wherein the fixing member comprises a lower wall and a side wall extending upward from the lower wall and coupled to an edge of the terminal insertion portion.

3. The battery unit of claim 2, wherein an upper surface of the side wall is coplanar with an upper surface of the cap plate.

4. The battery unit of claim 2, wherein the side wall extends upward above an upper surface of the cap plate.

5. The battery unit of claim 2, wherein the fixing member further comprises an extended portion extending outward from the side wall over an edge of the terminal insertion portion and supported on an upper surface of the cap plate.

6. The battery unit of claim 1, wherein the terminal portion is spaced apart from an upper surface of the cap plate.

7. The battery unit of claim 6, wherein the terminal portion extends in a direction along a major side of the cap plate, the connection portion comprises a first bending portion extending downward from the terminal portion and a second bending portion extending in the major side direction from the first bending portion, and the current collector portion extends downward from an edge of the second bending portion in a direction along a minor side of the cap plate.

8. The battery unit of claim 7, wherein the second bending portion is partially buried in the fixing member.

9. The battery unit of claim 7, wherein the second bending portion is entirely buried in the fixing member.

10. The battery unit of claim 6, wherein the fixing member comprises:
    a first fixing portion filling the terminal insertion portion and comprising the recessed portion; and
    a second fixing portion filling a gap between the terminal portion and the upper surface of the cap plate.

11. The battery unit of claim 1, wherein the terminal member comprises a positive terminal member and a negative terminal member, and the positive terminal member and the negative terminal member comprise dissimilar metals.

12. The battery unit of claim 11, wherein the positive terminal member comprises aluminum (Al), and the negative terminal member comprises copper (Cu).

13. The battery unit of claim 11, wherein the terminal member further comprises a welding layer on an upper surface of one of the positive terminal member or the negative terminal member and comprising a same metal as that of the other one of the positive terminal member or the negative terminal member.

14. A battery module comprising:
a plurality of the battery units of claim 1; and
a bus bar connecting terminal portions of the terminal members of neighboring battery units of the plurality of battery units.

15. The battery module of claim 14, wherein the fixing member comprises a lower wall and a side wall extending upward from the lower wall and coupled to an edge of the terminal insertion portion.

16. The battery module of claim 15, wherein the side wall extends upward above an upper surface of the cap plate.

17. The battery module of claim 15, wherein the fixing member further comprises an extended portion extending outward from the side wall over an edge of the terminal insertion portion and supported on an upper surface of the cap plate.

18. The battery unit of claim 1, wherein the recessed portion extends below an upper surface of the cap plate.

19. The battery unit of claim 1, wherein the recessed portion extends into the terminal insertion portion of the cap plate.

\* \* \* \* \*